Figure 1:
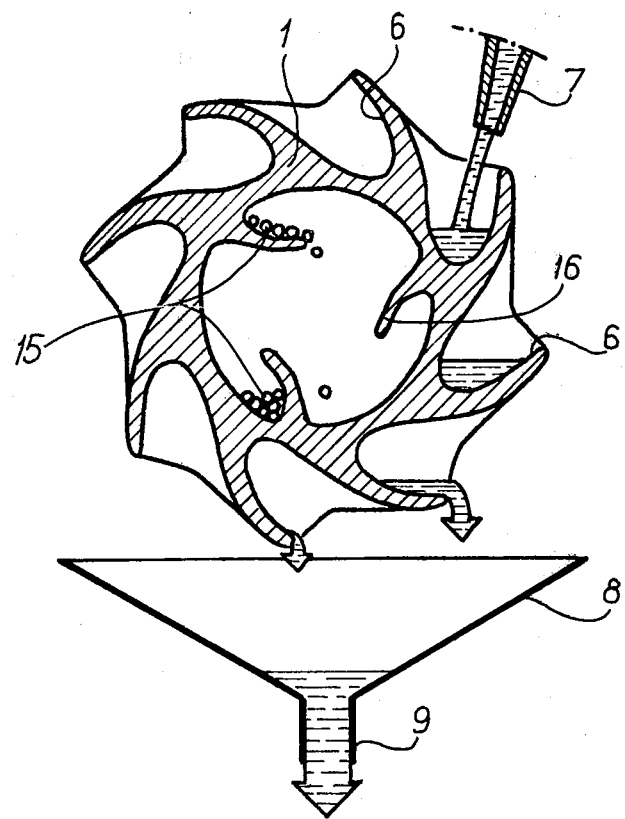

United States Patent [19]

Stenstrom

[11] 4,046,208
[45] Sept. 6, 1977

[54] APPARATUS FOR WEIGHING A FLOWING MATERIAL

[75] Inventor: Lennart Arvid Stenstrom, Huddinge, Sweden

[73] Assignee: Alfa-Laval AB, Tumba, Sweden

[21] Appl. No.: 636,376

[22] Filed: Dec. 1, 1975

[30] Foreign Application Priority Data

Dec. 12, 1974 Sweden ............................ 7415587

[51] Int. Cl.² ........................... G01G 1/00; G01F 3/28
[52] U.S. Cl. ........................................ 177/19; 177/83; 73/217
[58] Field of Search ............... 73/217; 177/19, 20, 177/83; 222/368, 369

[56] References Cited

U.S. PATENT DOCUMENTS

| 65,720 | 6/1867 | Brauer | 177/19 |
|---|---|---|---|
| 517,608 | 4/1894 | Finch | 177/19 |
| 1,904,223 | 4/1933 | Hanique | 73/217 |

Primary Examiner—Richard C. Queisser
Assistant Examiner—John P. Beauchamp
Attorney, Agent, or Firm—Cyrus S. Hapgood

[57] ABSTRACT

A drum rotatable about an axis through its center of gravity carries troughs located in a circle concentric to said axis and which are charged at a certain level with flowing material to be measured as to quantity, whereby the drum is influenced by a driving moment from the weight of the charged material. After a certain rotation of the drum, the troughs discharge the charged material at a lower level than said charging level. Means are provided for counteracting rotation of the drum by said driving moment, said means including interconnected scoops arranged in a circle concentric to an axis through the common center of gravity of the scoops, said last axis forming an angle with a vertical line. The drum rotates the scoops around said last-mentioned axis, and the scoops successively elevate a second material from a certain level and discharge it at a higher level. The drum forms a closed chamber containing a certain amount of the second material, and the scoops are located on the inside of the drum within said chamber, whereby an accurate measurement of the weight of the flowing material is effected regardless of changes in the density of the material.

2 Claims, 2 Drawing Figures

APPARATUS FOR WEIGHING A FLOWING MATERIAL

This invention relates to a novel apparatus for measuring the quantity of a flowing material, such as a liquid, a powder, etc.

When the quantity of a flowing material is to be measured, either the volume or the weight of the material can be determined.

One method of determining the volume of a flowing material resides in causing the material successively to fill a number of chambers having known volumes and which are successively emptied and refilled repeatedly, the number of filling and/or emptying occasions being registered so that the volume of the through-flowing material may be determined. In German Pat. No. 827,716, equipment is shown for determining the volume of a flowing liquid according to this principle. The equipment comprises a rotatable drum which defines said chambers. The chambers, being evenly distributed around the rotational axis of the drum, are arranged to be successively filled and emptied during rotation of the drum. The flowing material is then used for causing a driving moment on the drum and for causing a retarding moment thereon, so that a rotation is obtained which has a certain relation to the magnitude of the material flow per unit of time to the drum.

A similar method for determining the volume of the flowing material is disclosed in German Pat. No. 133,224. According to this method too, the flowing material is used for causing a driving moment on a drum, and for causing a retarding moment thereon. In this case, the equipment comprises two interconnected drums which are rotatable in a common trough. Each of the drums supports scoops around its periphery, the scoops on one of the drums being arranged to receive flowing material from an inlet conduit at a certain level and to discharge this material at a lower level in said trough, and the scoops on the other drum being arranged to elevate such material from the trough and discharge it at a higher level.

In each of these prior methods of determining the volume, gravity is used for transporting the material through the measuring equipment and also for the operation of the measuring equipment, but the measuring itself does not mean that the weight or mass of the material is determined.

In U.S. Pat. No. 2,654,246, an apparatus is disclosed for determining the weight of a flowing material and which comprises a drum rotatable around an axis through its center of gravity, the drum having several troughs arranged in a circle concentric to said axis. The apparatus also has means arranged to charge the troughs at a certain level with flowing material, the weight of which is to be determined, so that the drum is influenced by a turning moment mainly from the weight of the supplied material and thereby is rotated around its axis, the troughs being arranged after a cetain rotation of the drum to give off the supplied material at a level lower than the supply level. The apparatus further comprises means for counteracting rotation of the drum.

This last-described apparatus is very complicated and has a very limited range of measurement. Also, it offers a poor measuring accuracy within the limited range of measurement. One major reason for the last-mentioned disadvantage is that its function is not based on pure weighing of the flowing material.

An important object of the present invention is to provide a simple and inexpensive apparatus for determining the weight of a flowing material, which apparatus has a good accuracy of measurement over a relatively wide range of measurement.

This object is achieved by an improvement of an apparatus which, like the apparatus according to the above-mentioned German Pat. No. 133,224, comprises a drum rotatable around an axis through its center of gravity and associated with several troughs situated in a circle concentric to said axis, means arranged to charge the troughs at a certain level with flowing material, the quantity of which is to be determined, so that the drum is influenced by a driving moment from substantially the weight of the supplied material, the troughs being arranged after certain rotation of the drum to discharge the supplied material at a level lower than the supply level, and means for counteracting rotation of the drum due to a driving moment thereon, the latter means comprising several interconnected scoops situated in a circle concentric to an axis through the common center of gravity of the scoops, which axis forms an angle with a vertical line, the drum being arranged to rotate the scoops around their axis, and the scoops being arranged to elevate successively material from a certain level and discharge it at a higher level. According to the present invention, an apparatus of this kind is characterized in that the drum forms a closed chamber containing a predetermined amount of the last-mentioned material, and that the scoops are situated on the inside of the drum within this chamber.

The present invention provides a simple and inexpensive apparatus which can be used for accurate weighing of a flowing material essentially in the same mannner as a non-flowing material may be weighed on a lever balance. The driving moment acting on the rotatable drum is thus balanced, according to the invention, by the retarding moment acting in the opposite direction on the drum, which retarding moment will remain unchanged regardless of possible changes in the density of the flowing material during the weighing operation. With an apparatus according to either of the two German Pat. No. 133,224 and 827,716, the corresponding moment, acting against rotation of the drum, will vary with variations in the density of the flowing material, since the weight of the material quantity used for the retardation varies with the density of the material.

By keeping the material used to exert a retarding moment on the drum during operation confined in a closed chamber, the weight of the material will not change in course of time. Also, by having said closed chamber formed by the drum itself, no sealing is needed between stationary and movable parts of the apparatus. A sealing of this kind would cause friction, and this would adversely affect the accuracy of measurement of the apparatus.

Figure 2:
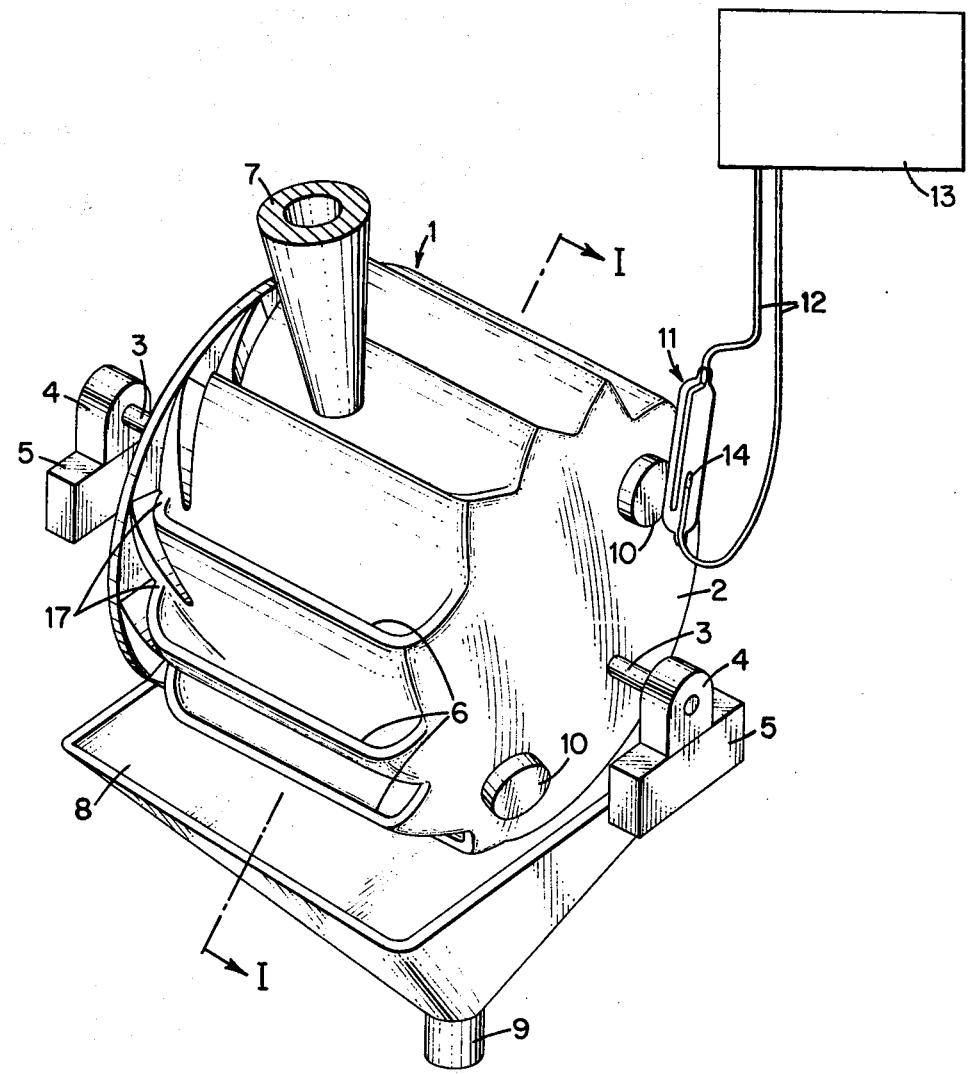

The invention is further described below with reference to the accompanying drawings, in which FIGS. 1 and 2 show a preferred embodiment of an apparatus according to the invention, FIG. 1 being a cross-sectional view taken along the line I—I in FIG. 2, the latter being a perspective view.

The apparatus in FIGS. 1 and 2 comprises a hollow cylindrical drum 1 having two end walls 2. Extending from the centers of the end walls 2 are two shafts 3, by means of which the drum 1 is supported and journalled in two bearings 4. The bearings 4 rest on solid supports 5. With this arrangement, the drum 1 is rotatable around an axis through its center of gravity.

On the outside of the drum 1 are several troughs 6, which are situated in a ring concentrically around the axis of the drum. The troughs are evenly distributed around the periphery of the drum.

Near the drum 1 at its upper part is a nozzle 7 through which liquid or any other flowing material, the weight of which is to be determined, is supplied. Below the drum 1 is a container 8 for collecting liquid which has passed the drum. The container 8 has an outlet 9.

On the outside of one end wall 2 of the drum 1 are fastened two permanent magnets 10, which are situated on diametrically opposite sides of the shaft 3 and at the same distance therefrom. Close to the same end wall 2 is a switch 11 which is arranged for actuation by the magnets 10, when these pass it, to close and then to open an electric circuit 12. In the circuit 12 is a conventional means 13 for automatic registration of the number of occasions when the circuit 12 is closed. Also, the switch 11 is of a conventional kind and comprises a metallic resilient element 14 operable by attraction from a magnet 10 to close the circuit 12 and, when the attraction ceases, to return by its resiliency to its original position in which the circuit 12 is opened.

In the hollow drum 1 a certain quantity of granular material 15 is confined, for instance, glass balls. Also, another kind of material, such as sand or liquid, may be used in this connection. It is also possible to have within the drum a small number of relatively large balls. On the inside of the peripheral wall of the drum 1 are three inwardly directed brackets 16, which are intended during rotation of the drum to act as scoops for lifting the material 15. Each scoop 16 is arranged during rotation of the drum to lift a certain quantity of material 15, and to discharge it at a certain level, so that it will fall back to its original position of rest, wherefrom it may be lifted again by another scoop. The number of scoops may be chosen at will, but preferably they are three, as mentioned here. In this way it is possible to discharge the whole content of one scoop into another scoop situated in from of the first one, seen in the direction of rotation.

When liquid is supplied through the nozzle 7, the trough 6 situated opposite the nozzle will be filled with liquid. This liquid will exert (due to its weight) a turning moment on the drum 1. Acting against this turning moment is the weight of the part of the granular material 15 within the drum, which by one scoop 16 would be elevated from its position of rest upon rotation of the drum clockwise, with respect to FIG. 1. When so much liquid has been supplied to said trough 6 that the turning moment from the liquid therein starts to overcome the moment from the said part of the material 15, the drum 1 is rotated a bit. A new trough 6 then will come into position opposite the nozzle 7. This trough is also charged with liquid, the drum then being further rotated.

When the trough 6 which was first charged approaches the lowest point of the drum, the liquid in the trough starts to run over the edge of the trough and down into the container 8. Gradually the trough 6 is emptied entirely, and the course is repeated in the same manner for the subsequent troughs.

When, by rotation of the drum, said part of the material 15 therein has been elevated a distance by the aforementioned scoop 16, another scoop 16 starts to elevate in the same way another part of the material 15 in the drum. After a certain rotation of the drum, the first material-elevating scoop 16 has assumed a position such that the elevated material starts to leave the scoop and fall back to the lowest part of the drum. When the scoop is situated at its highest point within the drum, all of the material has been discharged therefrom. Gradually the scoops 16 are filled and emptied in the same manner during the rotation of the drum. After the drum has started to rotate in this manner, it will continue as long as liquid is supplied through the nozzle 7.

The shape of the troughs 6 on the outside of the drum is determined partly with regard to the amount of liquid that is desired to be held therein during the operation of the apparatus. The troughs 6 are made large enough to contain a somewhat larger amount of liquid than the said desired amount in operation. This is in order that the apparatus may start, since a sufficiently large amount of liquid must be accommodated in the first filled trough 6 to overcome the moment caused by the material 15 within the drum, in spite of the fact that all but the said first trough are empty. When the apparatus has started, and several troughs thus contain liquid, all of the troughs are automatically charged with the same amount of liquid, i.e., the same weight of liquid.

From the driving moment of the liquid situated in the troughs 6 during operation of the apparatus, the magnitude of the counteracting or retarding moment, caused by the material 15 within the drum, is determined. The retarding moment is adjusted so that is will be as large as the driving moment, when the troughs 6 are filled to a desired degree. With reference thereto, the form of the inside scoops 16, and the amount of material that should be present within the drum 1, are determined.

The apparatus operates according to the principle that the liquid present in the troughs 6 during operation is balanced by a certain amount of material 15 held in a number of scoops 16 within the drum 1. The material 15 exerts on the drum a moment that is of the same magnitude as that exerted by the liquid, but in the opposite direction. Since during the rotation of the drum there will constantly be an uncharged mass of liquid in the troughs 6, the rotation of the drum will be a measurement of how many times this liquid mass is renewed, i.e., a measurement of how large a mass of liquid has been transported by the drum. By registration of the number of revolutions of the drum, the weight of the transported liquid may be determined. With the apparatus in FIGS. 1 and 2, a registration of this kind can be performed by means of the equipment 10–14. If desired, the velocity of the drum rotation may be sensed, too. This will automatically be a measurement of how large a mass of liquid is transported by the drum per unit of time.

For each revolution of the drum, it is performing an amount of work consisting of three times lifting a predetermined mass a certain distance. This amount of work is performed by the drum each revolution of its rotation, regardless of the velocity of the rotation. Of course, it has to be considered that the velocity of the rotation should be kept less than a certain value, so that the material within the drum will not be maintained at the periphery of the drum during the entire rotation by resulting centrifical forces. In that case, the energy used for the lifting work would be obtained as a driving moment on the drum, when the material moves downwards from the highest point of the drum to the lowest point thereof. Instead, it is intended in the present apparatus that the addition of potential energy, given to portions of the material upon its elevation within the drum, should be converted into heat when these portions of the material hit the lowest part of the drum after having been discharged from the scoops. The heat thus formed during operation is gradually conducted away from the material via the drum to the surrounding atmosphere and to the liquid which is situated in the troughs 6 and thus is contacting the outside of the drum.

It was mentioned above that in order for the apparatus to start, each of the troughs 6 preferably should be made so large that it contains more liquid than it should normally contain when the apparatus has come into operation. If it is desired that the troughs 6 should not be too over-dimensioned, it is possible to form each of them with an overflow outlet arranged to conduct liquid from the trough to a lower trough. Overflow outlets of this kind are shown in FIG. 2 at 17. In this way, when the apparatus is to be started, more than one trough may be charged with liquid from the liquid supply means of the apparatus for overcoming the moment that is caused by the material within the drum. If desired, every second trough, seen in the direction of the periphery of the drum, may be somewhat displaced axially relative to the rest of the troughs, and the said overflow outlets may be arranged alternately at different ends of the troughs, seen axially.

As shown in FIG. 1, each scoop 16 is so configurated that it lifts its content of the material 15 to a high level which is at least as high as the level of the drum axis, before discharging this material as the drum rotates on its axis. Also, as shown in FIG. 1, the chamber within the drum is free of any surface which can contact the material 15 as it falls from a scoop 16 to the lowermost part of the chamber, this arrangement being facilitated by the fact that the drum chamber contains only three scoops 16. Thus, as the drum rotates, the material 15 falls freely and directly from the successive scoops at said high level to the lowermost part of the chamber, whereby a maximum amount of energy is obtained from this material.

I claim:
1. Apparatus for determining the quantity of a flowing material, which comprises a drum mounted for rotation about an axis through its center of gravity, said drum being a hollow cylinder having two spaced circular end walls to form a closed chamber, the drum having on the outside wall thereof between said end walls a plurality of troughs located in a circle concentric to said axis, means for charging the troughs at a certain level with flowing material, the quantity of which is to be determined, so that the drum is influenced by a driving moment from substantially the weight of the charged material, the troughs being arranged to discharge, after a certain rotation of the drum, the charged material at a level lower than said charging level, and means for counteracting rotation of the drum by said driving moment thereon, said counteracting means comprising only three interconnected scoops located within said closed chamber between said end walls and in a circle concentric to an axis through the common center of gravity of the scoops. the last-mentioned axis forming an angle with a vertical line, the drum being arranged to rotate the scoops around said last-mentioned axis, a predetermined amount of a second material in the closed chamber, the scoops being arranged to successively elevate the second material from a certain level and discharge substantially all of it at a higher level which is at least at the level of said drum axis, the closed chamber being free of any surface which can contact the second material as it falls from a scoop at said higher level to the lowermost part of the chamber during rotation of the drum, whereby the second material falls freely and directly from said higher level to the lowermost part of the chamber and an accurate measurement of the weight of the flowing material is effected regardless of changes in the density of the material.

2. The apparatus of claim 1, in which each said trough has an overflow outlet positioned, upon said charging of the trough with flowing material, to direct excess material into an underlying one of said troughs.

* * * * *